Patented June 24, 1930

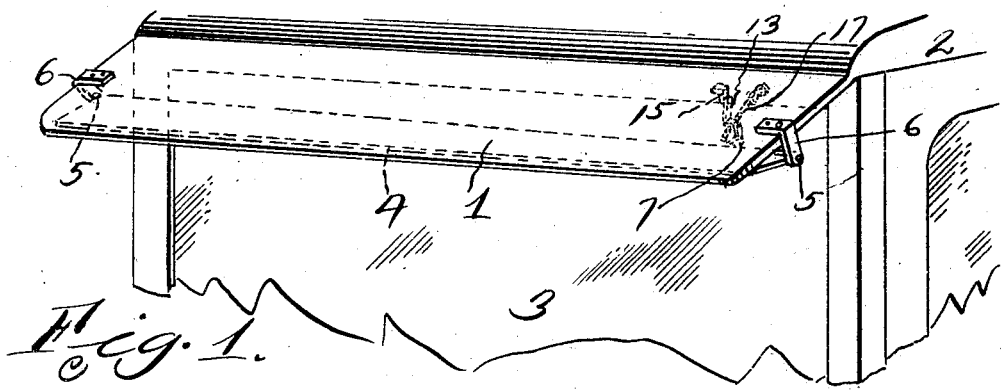
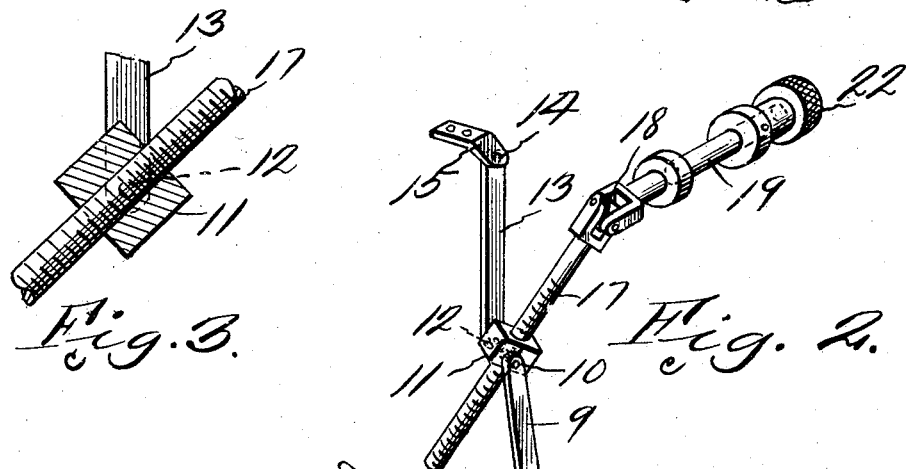
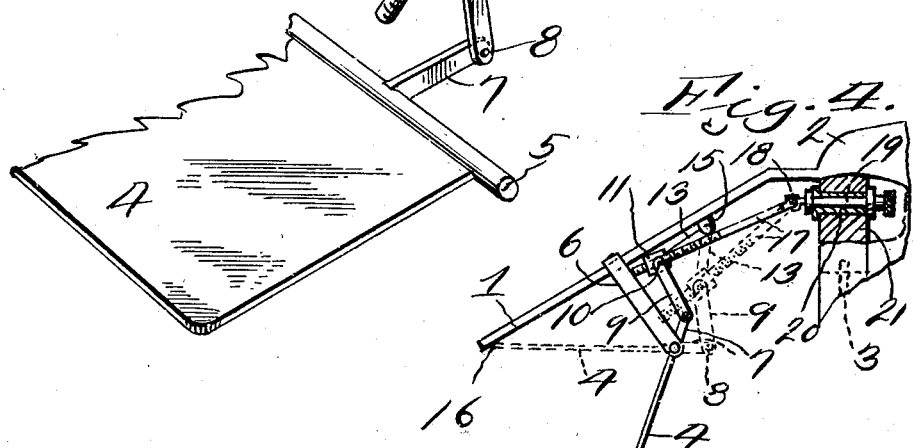

1,766,884

UNITED STATES PATENT OFFICE

CHARLES F. COX, OF OMAHA, NEBRASKA

GLARE PROTECTOR

Application filed April 15, 1929. Serial No. 355,262.

The invention relates to glare shields for use in connection with automobile windshields, and has for its object to provide a device of this character comprising a member extending across the underside of the visor of the automobile top, forwardly of the windshield and supported by said visor, and means within the automobile and connected with the glare shield in a manner whereby said glare shield may be pivotally moved downwardly to a position forwardly of the windshield glass, or upwardly adjacent the visor when not in use.

A further object is to support the glare shield on brackets extending downwardly from the visor, and to control the visor by means of a rotatable member extending through the windshield frame and having universally connected thereto a rotatable threaded shaft, which shaft is threaded through a block, to which block is pivotally connected the adjacent ends of link members. One of said link members is hingedly connected to the visor and the other link member hingedly connected to a rearwardly extending arm carried by the glare shield for controlling the movement of the glare shield.

A further object is to position the pivotal connection between the links and the visor and the arm of the glare shield and the pivotal connections of the links to the threaded block, whereby said block pivotal connections will be disposed forwardly of the first mentioned pivoted connections when the free end of the glare shield is in engagement with the under side of the visor, thereby allowing the visor to closely engage the free end of the glare shield, for preventing rattling of the glare shield against the visor when the device is in inoperative position.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the glare shield, showing the same in inoperative position.

Figure 2 is a perspective view of one end of the glare shield and the operating mechanism.

Figure 3 is a vertical longitudinal sectional view through the threaded block.

Figure 4 is a side elevation of the visor and a portion of an automobile top, showing the protector applied thereto.

Referring to the drawing, the numeral 1 designates the visor of a conventional form of automobile top 2, and 3 a windshield. Under some driving conditions glare from the sun or from lights of approaching vehicles, blind persons within the automobile, particularly the operator, and to obviate this difficulty the device is primarily designed. In some glare shields, the shield is not large enough to break up light rays from various angles, consequently to obviate this difficulty the glare shield 4 is made relatively long and substantially the same length as the visor. The glare shield 4 may be made of any material and of any color for breaking up light rays, for instance red or green glass, and applicant does not limit himself in this particular.

The ends of the shield 4 are provided with pintles 5, which pintles are rotatably mounted in downwardly extending brackets 6 carried by the visor, and extending rearwardly from the rear pivoted edge of the shield is an arm 7, to which is pivotally connected at 8 an upwardly extending link 9. The link 9 has its upper end pivotally connected at 10 to a block 11, and to the opposite side of which block is pivotally connected at 12 an upwardly extending link 13. The link 13 is in turn pivoted at 14 to a bracket 15 carried by the underside of the visor 1, therefore it will be seen that when the block 11 is moved forwardly, swinging forwardly and upwardly on the pivot point 14 to the position shown in Figure 4, the glare shield will be swung downwardly and rearwardly to a position forwardly of the windshield 3 for breaking up light rays passing rearwardly in the line of the eyes of the operator and occupants of the automobile.

It will be noted that the links 9 and 13 are proportioned whereby when the free edge 16 of the glare shield is in engagement with the underside of the visor 1, they will not be in alinement, therefore it will be seen that a continued rotation of the threaded shaft 17 will cause the free edge of the glare shield to be forced into close binding engagement with the visor, consequently preventing rattling of any parts. The threaded shaft 17 extends upwardly and rearwardly and is provided with a universal connection 18 with a rotatable shaft 19, and which shaft is rotatably mounted in a bearing sleeve 20 extending through the upper rail 21 of the windshield frame, and terminates in a handle member 22 adapted to be grasped by the operator for rotating the shafts 19 and 17 for controlling the movement of the glare shield.

From the above it will be seen that a glare shield is provided which may be easily and quickly applied to a conventional form of automobile top visor without varying the construction thereof; may be adjusted from within the automobile and constructed in a manner whereby the shield may be held in close binding engagement with the underside of the visor for holding the same against rattling.

The invention having been set forth what is claimed as new and useful is:

The combination with a glare shield transversely pivoted and supported beneath an automobile visor and forwardly of a windshield, of means for controlling said glare shield, said means comprising a shaft rotatably mounted above the windshield, a threaded shaft universally connected to the first mentioned shaft and extending forwardly, a rearwardly extending arm carried by the glare shield, double link connections between said arm and the visor, a block connecting the double links, said threaded shaft being threaded through said block.

In testimony whereof he hereunto affixes his signature.

CHARLES F. COX.